US009360898B2

(12) United States Patent
Ku (10) Patent No.: US 9,360,898 B2
(45) Date of Patent: Jun. 7, 2016

(54) METHOD AND TERMINAL FOR PROVIDING USER INTERFACE USING TILT SENSOR AND KEY INPUT (75) Inventor: Hyo Jeon Ku, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 711 days.

(21) Appl. No.: 13/091,683

(22) Filed: Apr. 21, 2011

(65) Prior Publication Data
US 2011/0259724 A1 Oct. 27, 2011

(30) Foreign Application Priority Data

Apr. 21, 2010 (KR) .................. 10-2010-0036807

(51) Int. Cl.
G06F 1/16 (2006.01)
G06F 3/0346 (2013.01)
G06F 3/041 (2006.01)
G06F 3/02 (2006.01)
H04M 1/23 (2006.01)

(52) U.S. Cl.
CPC ............ *G06F 1/1694* (2013.01); *G06F 1/1626* (2013.01); *G06F 3/0416* (2013.01); *H04M 1/23* (2013.01); *G06F 3/0202* (2013.01); *G06F 3/0346* (2013.01); *G06F 2203/0381* (2013.01); *H04M 2250/12* (2013.01); *H04M 2250/22* (2013.01)

(58) Field of Classification Search
CPC ..... G06F 3/017; G06F 3/0346; G06F 3/0202; G05G 9/047

USPC .............................. 340/5.52, 5.83; 341/20–23
See application file for complete search history.

(56) References Cited

U.S. PATENT DOCUMENTS

| 6,201,554 | B1 * | 3/2001 | Lands ............................ 345/169 |
| 8,138,953 | B2 * | 3/2012 | Hsieh ............................... 341/23 |
| 2004/0100441 | A1 | 5/2004 | Rekimoto et al. | |
| 2007/0054651 | A1 * | 3/2007 | Farmer et al. .................. 455/352 |
| 2007/0139172 | A1 * | 6/2007 | Watanabe et al. ......... 340/426.13 |
| 2008/0129552 | A1 * | 6/2008 | Wigdor ............................ 341/22 |
| 2010/0007518 | A1 * | 1/2010 | Kang et al. ................ 340/825.72 |
| 2010/0053458 | A1 * | 3/2010 | Anglin et al. ................. 348/731 |

FOREIGN PATENT DOCUMENTS

| KR | 10-2003-0047095 | 6/2003 |
| KR | 10-2003-0068581 | 8/2003 |
| KR | 10-2010-0009841 | 1/2010 |

OTHER PUBLICATIONS

Korean Office Action issued for KR 10-2010-0036807 dated Feb. 3, 2016, 10 pgs.

* cited by examiner

Primary Examiner — Mohamed Barakat (57) ABSTRACT

A method of providing a user interface in a terminal equipped with a tilt sensor. The method includes sensing an input of a key. The method also includes sensing a tilt input by the tilt sensor after sensing the input of the key. The method further includes performing a function corresponding to a combination of the key and the tilt input, when the tilt sensor senses the tilt input.

22 Claims, 8 Drawing Sheets

METHOD AND TERMINAL FOR PROVIDING USER INTERFACE USING TILT SENSOR AND KEY INPUT

CROSS-REFERENCE TO RELATED APPLICATION(S) AND CLAIM OF PRIORITY

The present application is related to and claims the benefit under 35 U S.C. §119 a of a Korean patent application filed in the Korean Intellectual Property Office on Apr. 21, 2010 and assigned Serial No. 10-2010-0036807, and the entire disclosure of which is hereby incorporated by reference.

TECHNICAL FIELD OF THE INVENTION

The present invention relates to a method for providing a user interface and a terminal implementing the same, and more particularly, to a method for providing a user interface using a tilt sensor and a key input, and a terminal for implementing the same.

BACKGROUND OF THE INVENTION

In general, a dome key type is widely used as an input unit of a portable terminal.

However, the dome key type is so standardized that an implementable user interface is exceedingly restricted. In addition, it is necessary to have a space for a circuit, a component or a tool such as a dome key, a switch, a keypad and an electrostatic discharge (ESD) protecting element. In order to solve such problems, a touch screen type is used. However, even when using the touch screen type, a main function key is implemented by the dome key type due to the limit of the implementation of user interface using a graphic and the user friendliness.

Figure 1:
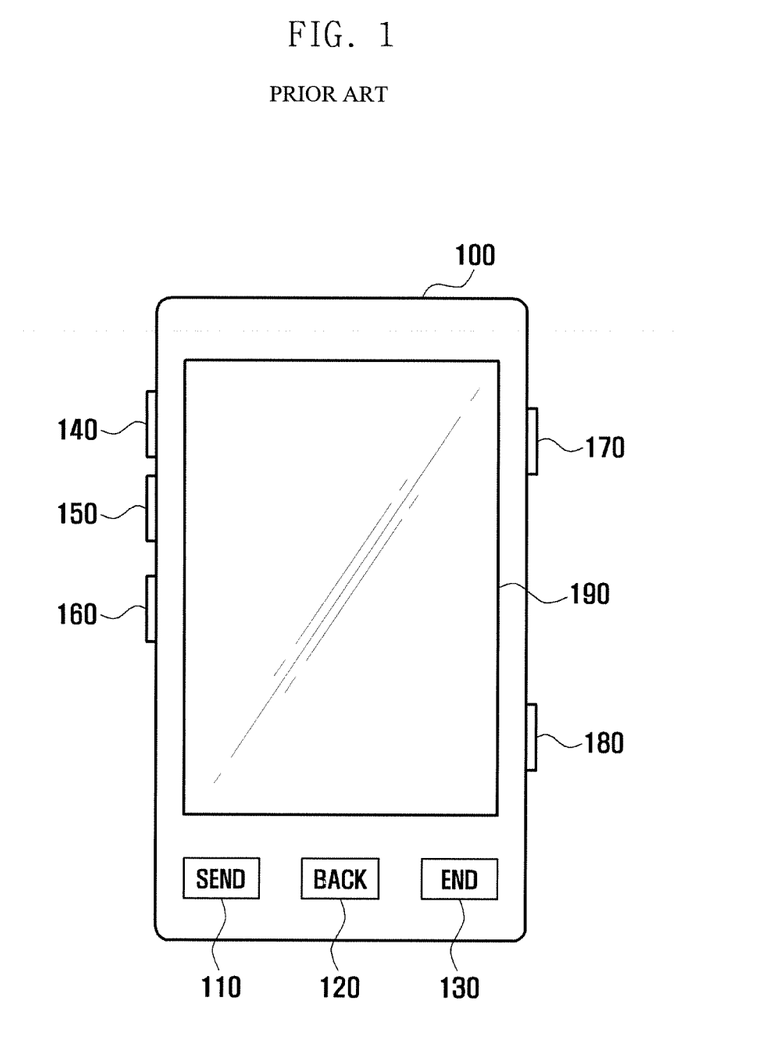
FIG. 1 is a front view of a conventional portable terminal.

FIG. 1 is a front view of a conventional portable terminal 100.

Referring to FIG. 1, the conventional portable terminal 100 includes a touch screen 190. For user's convenience, the terminal 100 includes a SEND key 110, a BACK key 120, an END key 130, a volume increase key 140, a volume decrease key 150, a multi function key 160, a hold key 170 and a camera key 180. The SEND key 110, the BACK key 120, the END key 130, the volume increase key 140, the volume decrease key 150, the multi function key 160, the hold key 170 and the camera key 180 are implemented as dome keys.

Various components are necessary so as to sense the input of the dome keys 110-180. For the implementation of the dome key type, it is necessary to have a mounting space. For this reason, problems related to restriction of shape, restriction of designing hardware and instrument, and increase of costs can occur. Moreover, due to a component and a structure which are necessary when using the dome key type (e.g., a key Panel Board Assembly (PBA) or a Key Flexible Printed Circuit Board (FPCB)), problems related to Radio Frequency (RF) and Global Positioning System (GPS) characteristic deterioration, audio performance degradation due to speaker resonance space reduction, wetting/moisture invasion due to key structure addition, and process or progressive one piece/set defect may occur.

SUMMARY OF THE INVENTION

To address the above-discussed deficiencies of the prior art, the present invention is provided in view of the above problems, and is capable of minimizing an exposed key, implements a graceful design and a performance optimization of tool and hardware, and reduces costs.

In accordance with an aspect of the present invention, a method of providing a user interface in a terminal equipped with a tilt sensor includes sensing an input of a key. The method also includes sensing a tilt input by the tilt sensor after sensing the input of the key. The method further includes performing a function corresponding to a combination of the key and the tilt input, when the tilt sensor senses the tilt input.

In accordance with another aspect of the present invention, a terminal includes a key configured to be pressed by a user and a key input sensing circuit configured to send an input of the key to a controller. The terminal also includes a tilt sensor configured to sense a tilt input of a terminal and a function mapping storage configured to store a function corresponding to a combination of the key and a tilt input sensed by the tilt sensor. The terminal further includes a controller configured to obtain and perform the function corresponding to the combination of the key and a tilt input from the function mapping storage, when the tilt sensor senses tilt input after receiving the input of the key through the key input sensing circuit.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 2 through 8, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged terminal. Detailed descriptions of well-known functions and structures incorporated herein may be omitted to avoid obscuring the subject matter of the present invention.

Figure 2:
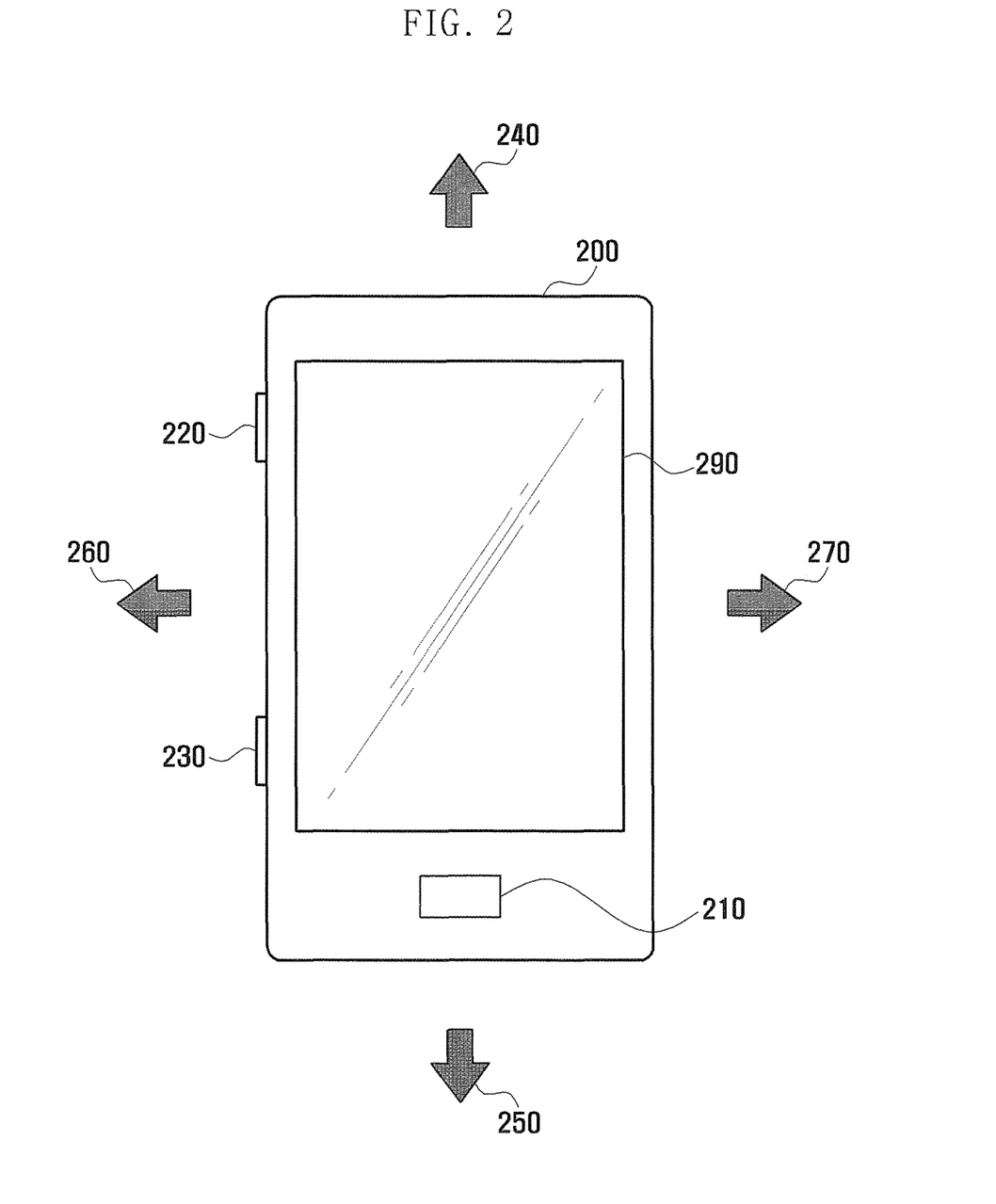
FIG. 2 is a front view of a terminal according to an embodiment of the present invention.

FIG. 2 is a front view of a terminal 200 according to a first embodiment of the present invention.

Referring to FIG. 2, the terminal 200 according to a first embodiment of the present invention includes a touch screen 290, a first key 210, a second key 220 and a power key 230. In FIG. 2, for convenience, it is illustrated that the second key 220 and the power key 230 are protruded from the surface of terminal 200. However, depending on embodiments, the second key 220 and the power key 230 may not protrude from the surface of terminal 200. That is, the upper portion of the second key 220 and the power key 230 may have the same height as the surface of the terminal 200 or the upper portion of the second key 220 and the power key 230 can exist in a location concave from the surface of the terminal 200. The first key 210 is positioned in the front side of the terminal 200 and the second key 220 is positioned at the side of the terminal 200. Thus, the first key 210 may be called a main key 210, and the second key 220 may be called a side key 220. However, the location of the first key 210, the second key 220, and the power key 230 shown in FIG. 2 is a location according to a first embodiment of the present invention. According to another embodiment of the present invention, the first key 210, the second key 220 and the power key 230 can be installed in another location of the terminal 200. By using the power key 230, user turns the power of the terminal 200 on or off. User operates the first key 210 and the second key 220 and can control the terminal 200 through various operations such as tilting or shaking the terminal 200. The detailed configuration of the terminal is described later with reference to FIGS. 3 through 5.

Figure 3:
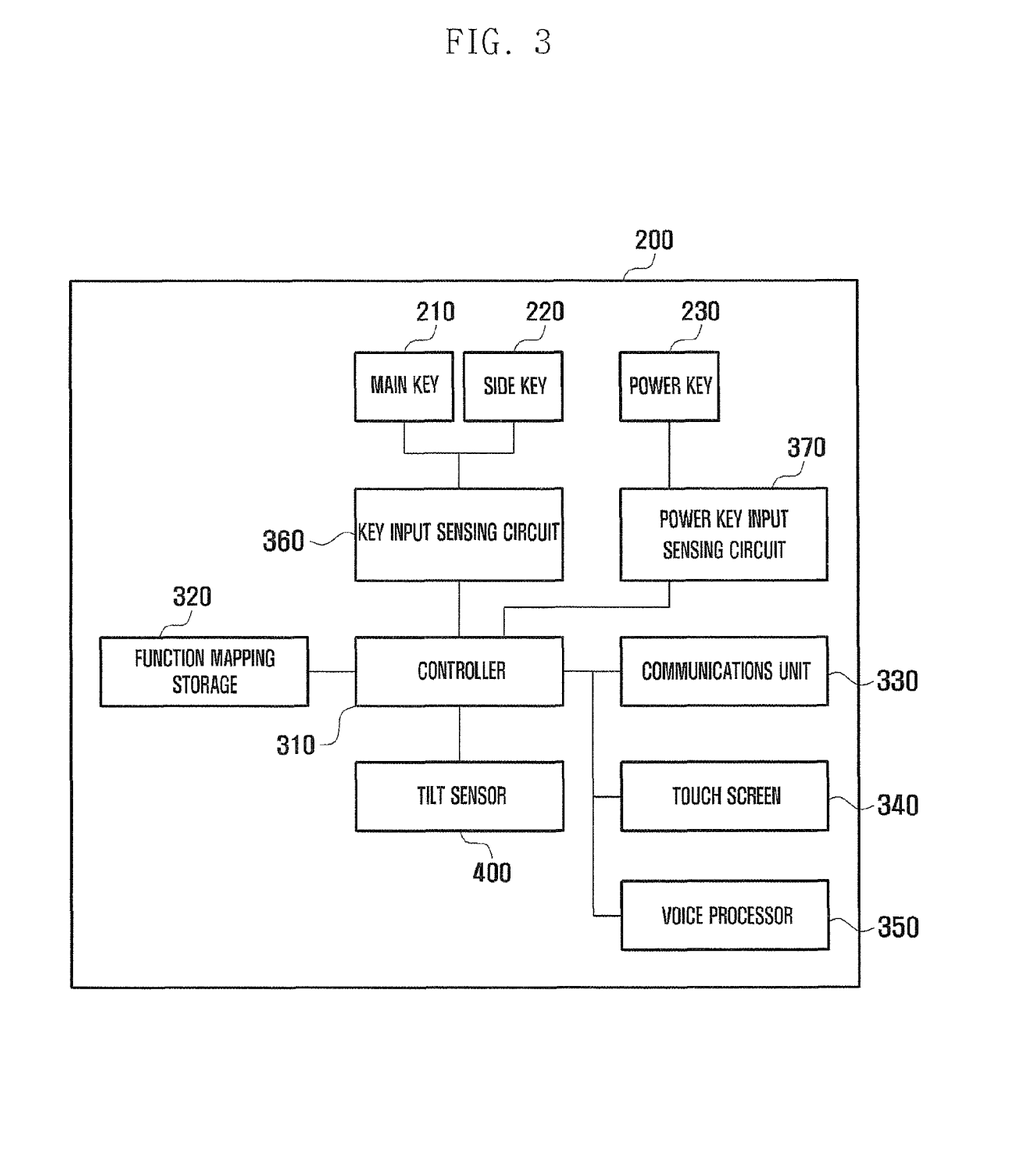
FIG. 3 is a block diagram of a terminal according to an embodiment of the present invention.

FIG. 3 is a block diagram of a terminal 200 according to a first embodiment of the present invention.

Referring to FIG. 3, the terminal 200 according to a first embodiment of the present invention includes a main key 210, a side key 220, a power key 230, a key input sensing circuit 360, a power key input sensing circuit 370, a function mapping storage 320, a controller 310, a communications unit 330, a touch screen 340, a voice processor 350 and a tilt sensor 400. The main key 210, the side key 220 and the power key 230 were illustrated in FIG. 2. The key input sensing circuit 360 sends the input of the main key 210 and the side key 220 to the controller 310. The key input sensing circuit 360 can send a corresponding signal to the controller 310 according to the input of the main key 210 or the side key 220. The key input sensing circuit 360 can generate two or more corresponding signals according to the input of the main key 210 or the side key 220 and send them to the controller 310. The controller 310 can recognize the key input according to the combination of the received signal.

Where the main key 210 and the side key 220 are dome keys, when the main key 210 or the side key 220 is pressed, a switch coupled to the main key 210 or the side key 220 is connected to generate a signal corresponding to the pressed key, such that the generated signal can be sent to the controller 310. The power key input sensing circuit 370 can send the input of the power key 230 to the controller 310. The configuration of the power key input sensing circuit 370 can be implemented to be similar to the key input sensing circuit 360. However, according to another embodiment, the power key input sensing circuit 370 can send the input of the power key 230 to a separate power module instead of the controller 310.

The tilt sensor 400 senses the tilt input of the terminal 200. A 3-axis tilt sensor can be used as an example of the tilt sensor 400. The tilt sensor 400 can sense the shake input of the terminal 200 as well as the tilting state. When the tilt sensor 400 is deactivated, the tilt sensor 400 can be activated according to the activation control signal of the controller 310. Particularly, in the portable terminal, the activation state of the tilt sensor 400 by the controller 310 can be controlled for battery-saving.

Figure 4:
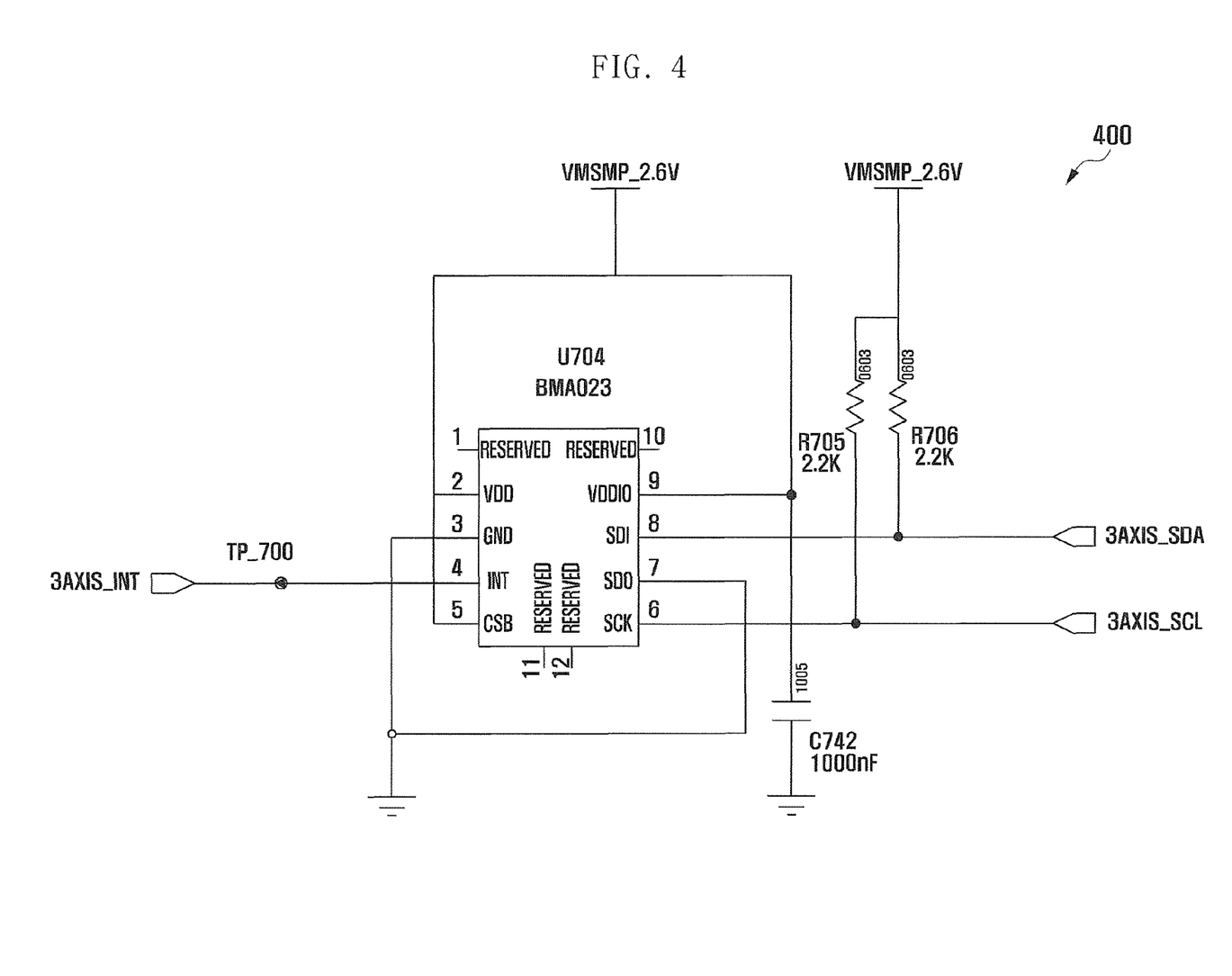
FIG. 4 is a circuit diagram of a tilt sensor according to an embodiment of the present invention.

FIG. 4 is a circuit diagram of a tilt sensor 400 according to a first embodiment of the present invention.

Here, disclosed is a circuit diagram of a 3-axis sensor. Since the configuration and the operation of a 3-axis sensor and the control method of 3-axis sensor are well known, the detailed description is omitted. The communications unit 330 manages the data transmission and reception of the terminal 200 with the base station. The touch screen 340 displays a screen to a user and receives a user input independently of the input from the dome keys 210, 220, 230 to send to a main controller. When talking over the telephone, the voice processor 350 changes user voice into an electric signal to send to the communication unit 330 or changes an electric signal received from the communications unit 330 into voice so that user can hear. Since the configuration of the communications unit 330, the touch screen 340, and the voice processor 350 is well known, the detailed description is omitted. The controller 310 receives the input of the main key 210 and side key 220 and receives a tilt input from the tilt sensor 400 to perform a relevant function. The functions that the controller 310 performs according to the input of the main key 210 and the side key 220 and according to the input of the tilt sensor 400 are described later with reference to FIG. 5. The controller 310 receives the input of power key 230 and, accordingly, can control the power. As mentioned above, depending on embodiments, a separate power module which is not the controller 310 receives the input of the power key 230 and, accordingly, can control the power. The function mapping storage 320 stores a function corresponding to the combination of the input of the main key 210 and the side key 220 and the input of the tilt sensor 400 and provides this to the controller 310. The function corresponding to the combination of the input of the main key 210 and the side key 220 and the input of the tilt sensor 400 is described later with reference to FIG. 5.

Figure 5:
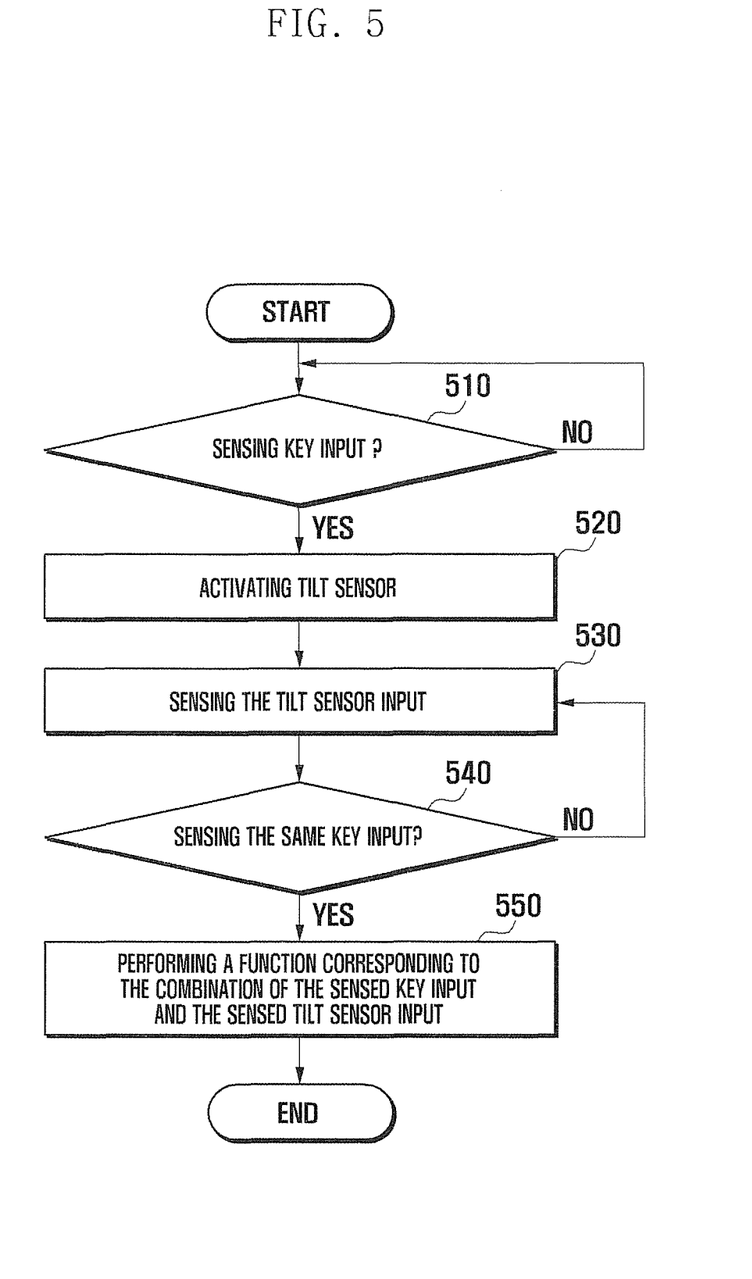
FIG. 5 is a flowchart of a user interface providing process of a terminal according to an embodiment of the present invention.

FIG. 5 is a flowchart of a user interface providing process of a terminal 200 according to a first embodiment of the present invention.

Referring to FIG. 5, the controller 310 of the terminal 200 determines whether it senses a key input (a first input) (block 510). Here, the key input includes an input of the main key 210 or an input of the side key 220. When the controller 310 receives the input signal of the main key 210 or the side key 220 and senses the input of the main key 210 or the side key 220, the user interface providing process proceeds to the next block. When the controller 310 is unable to sense the input of the main key 210 or the side key 220, the user interface providing process does not proceed to the next block and waits for the sensing of key input.

When the key input is sensed at block 510, the controller 310 activates the tilt sensor 400 (block 520). As described above, particularly, in the portable terminal, the tilt sensor 400 which is not used in a normal state can be set to a non-activation state. When the tilt sensor 400 is to be activated like block 510 where the key input is sensed, the tilt sensor 400 can be activated. However, according to another embodiment where the tilt sensor 400 is maintained in an active state, the sensing of tilting input of next block can be directly performed without performing block 520. The tilt sensor 400 is activated and senses the tilt input and, accordingly, sends the sensed signal to the controller 310 (block 530). Since the method of sensing the tilt of the terminal 200 by the tilt sensor 400 and the method of changing the sensed tilt into a sensing signal are well known, the detailed description is omitted. As an example of the tilt input sensed by the tilt sensor 400, when the front side of the terminal 200 shown in FIG. 2 is parallel with the horizontal plane, it may be called a horizontal state. Moreover, when an upper direction 240 is tilted to be closer to the horizontal plane than a lower direction 250 based on the horizontal state, it may be called as the upward tilt state. When the lower direction 250 is tilted to be closer to the horizontal plane than the upper direction 240, it may be called as the downward tilt state. When a left direction 260 is tilted to be closer to the horizontal plane than a right direction 270, it may be called as the left tilt state. When the right direction 270 is tilted to be closer to the horizontal plane than the left direction 260, it may be called as the right tilt state. When the extent of tilt of the terminal 200 is within a preset value, the tilt sensor 400 may recognize that the terminal 200 is in the horizontal state. When the extent of tilt of the terminal 200 is over a preset value, the tilt sensor 400 may recognize that the terminal 200 is in one of an upward tilt state, a downward tilt state, a left tilt state, and a right tilt state, according to the tilting direction. When an upward tilt or a downward tilt is recognized together with a left tilt or a right tilt, the tilt with a greater magnitude can be admitted as a tilt side. The tilt sensor 400 can recognize a shake input. In an embodiment where the tilt sensor 400 recognizes the shake input, when the shake input is sensed when the terminal 200 is tilted, or when both the tilt input and the shake input are sensed, the tilt sensor 400 can determine that one of the tilt input and the shake input is sensed by a predetermined setting. The controller 310 determines whether an input (a second input) which is the same key as the key inputted at block 510 (a first input) is sensed (block 540). For example, if the main key 210 was inputted at block 510, it is determined whether the input of the main key 210 is sensed at block 540.

Although the main key 210 was inputted at block 510, when the input of the side key 220 is sensed at block 540, the input of the side key 220 may be ignored, or may be recognized as the key input of block 510, or may be recognized as an input of terminating the user interface providing process. Here, it is assumed that a key input that is different from the key inputted at block 510 is ignored. If the controller 310 senses a key input that is the same as the key input sensed at block 510, it proceeds to the next block. If the controller 310 does not sense the key input which is the same as the key input sensed at block 510, it proceeds to block 530, such that the tilt sensor 400 continuously senses the tilt input and sends this to the controller 310.

The controller 310 performs a function corresponding to the combination of the key input sensed at block 510 and the tilt input sensed at block 530 (block 550). The tilt input sensed at block 530 is a tilt input which is finally sensed before the key input (a second input) of block 540 is sensed, since the process of block 530 is to be repeated as long as the key input (a second input) of block 540 is not sensed. For example, when a user inputs the main key 220, and inputs again the main key 220 after tilting the terminal 200 with an upward tilt state, the controller 310 inquires information stored in the function mapping storage 320 and performs a function corresponding to the combination of the main key 220 and the upward tilting. Examples of a function corresponding to the combination of the key and the tilting are shown in Table 1.

TABLE 1

| | main key 210 | side key 220 |
|---|---|---|
| Upward tilting | No operation | VOLUME UP |
| Downward tilting | No operation | VOLUME DOWN |
| Left tilting | SEND | MP3 MODE |
| Right tilting | END | FAVORATE MENU |
| Horizontality | BACK | HOLD |

For example, when the main key 210 is pressed and the terminal is tilted toward the right side, and then, when the main key 210 is pressed again, the terminal 200 performs the END function. In Table 2, each function used in Table 1 is illustrated.

TABLE 2

| Function | Explanation |
|---|---|
| SEND | The same function as the existing SEND key. Call, Message sending. |
| END | The same function as the existing END key. Call termination, Return to initial screen. |
| BACK | The same function as the existing BACK key. Function cancel, Return to previous menu. |
| VOLUME UP | Volume increase, Increase of voice or bell sound in the call. |
| VOLUME DOWN | Volume decrease, Decrease of voice or bell sound in the call. |
| MP3 MODE | Playing MP3 player |
| FAVORITE MENU | Executing favorite menu |
| HOLD | Locking touch screen |

The functions disclosed in Table 1 and Table 2 represent just one embodiment, and thus, other functions can be performed according to another embodiment. When keys 210, 220 are pressed for a preset time, for example, over 1 second, another function can be performed. For example, the terminal 200 can enter a camera mode when the side key 220 is pressed over 1 second. In the camera mode state, the side key 220 can be used as a camera shutter.

Figure 6:
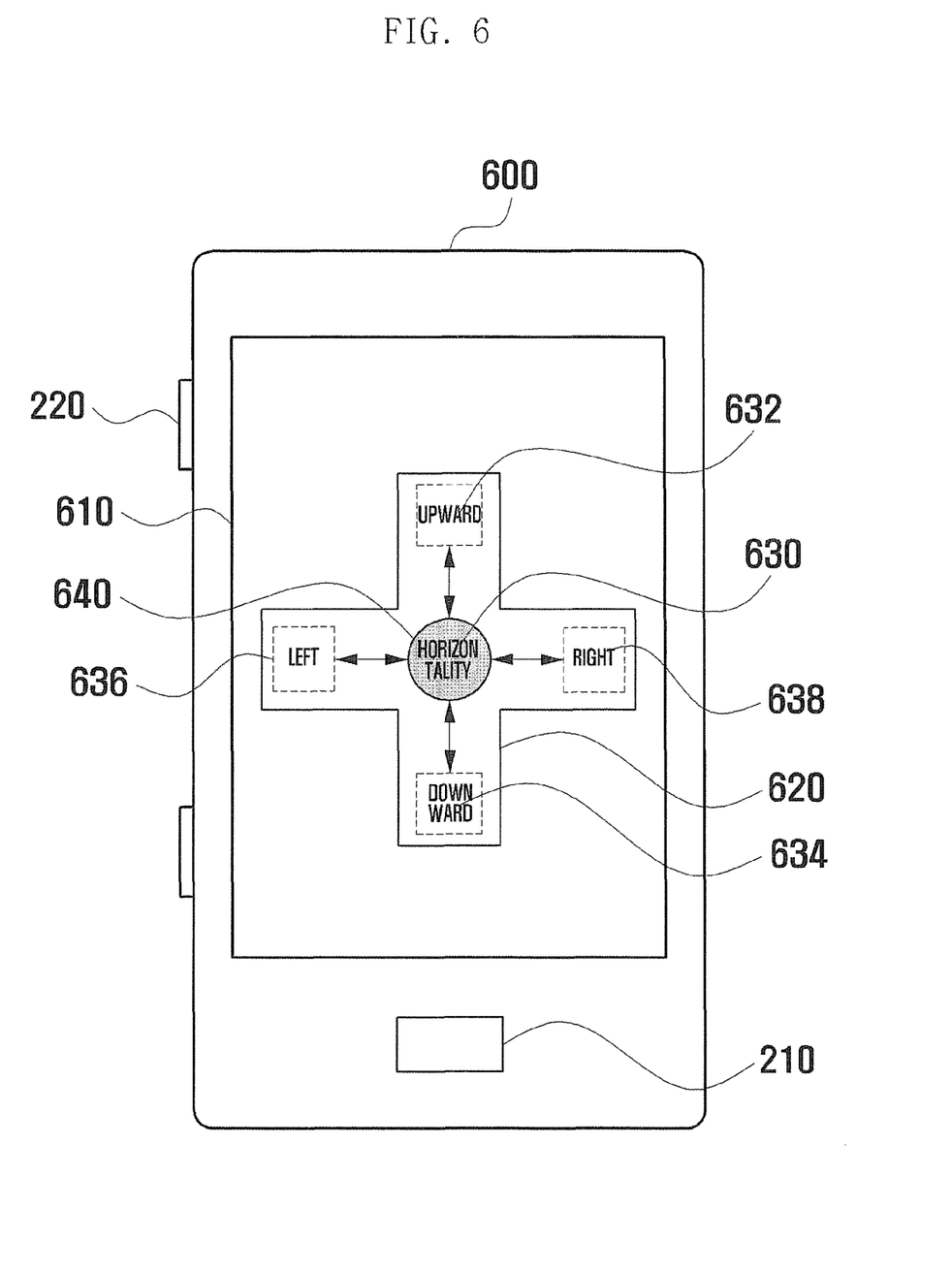
FIG. 6 is a drawing illustrating a terminal according to another embodiment of the present invention.

FIG. 6 is a drawing illustrating a terminal 600 according to a second embodiment of the present invention.

According to a second embodiment of the present invention, if an input of the main key 210 or the side key 220 is sensed at block 510 of FIG. 5, a display unit 610 of a terminal 600 can display the tilt direction which the tilt sensor 400 sensed.

Referring to FIG. 6, the terminal 600 can display the current tilt direction by using a cursor 640 having a circle shape.

In FIG. 6, the terminal 600 is in the horizontal state, and the cursor 640 having a circle shape indicates a horizontal position 630. If user tilts the terminal 600 so that an upward part 632 of the terminal 600 approaches the ground, the cursor 640 moves to the upward part 632. If user tilts the terminal 600 so that a downward part 634 of the terminal 600 approaches the ground, the cursor 640 moves to the downward part 634. Even when user tilts the terminal 600 toward the left side or the right side, the cursor 640 moves to a left side 636 or a right side 638 depending on the direction in which the terminal 600 tilts. In this way, when the movement of the cursor is displayed in the display unit 610, user can easily know the degree of tilting to perform a desired function.

Figure 7:
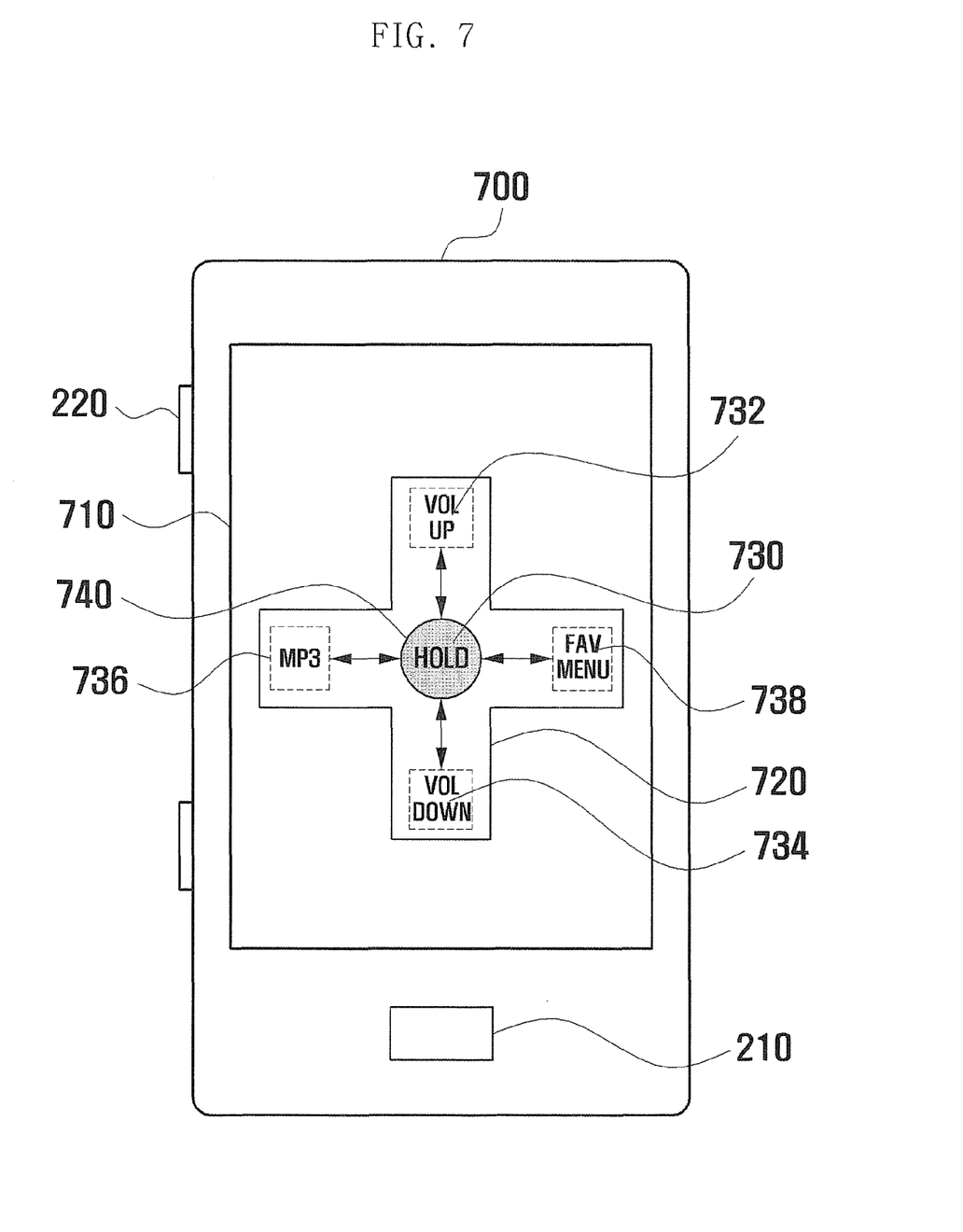
FIG. 7 is a drawing illustrating a terminal according to yet another embodiment of the present invention.

FIG. 7 is a drawing illustrating a terminal 700 according to a third embodiment of the present invention.

According to a third embodiment of the present invention, if the input of the main key 210 or the side key 220 is sensed at block 510 of FIG. 5, a display unit 710 of a terminal 700 displays an identifier of a function corresponding to a tilt input which the key 210 or 220 which sensed the input and the tilt sensor 400 can sense. For example, if the input of the side key 220 is sensed at block 510, according to the function which is performed in combination with the side key 220, a "VOL UP" 732 can be displayed in the upward part, a "VOL DOWN" 734 can be displayed in the downward part, a "MP3" 736 can be displayed in the left side, a "FAV MODE" 738 can be displayed in the right side, and a "HOLD" 730 can be displayed in the central part. In this way, when the display unit 710 of the terminal 700 displays an identifier of a function corresponding to a tilt input, user can easily know the direction of tilting to perform a desired function.

Figure 8:
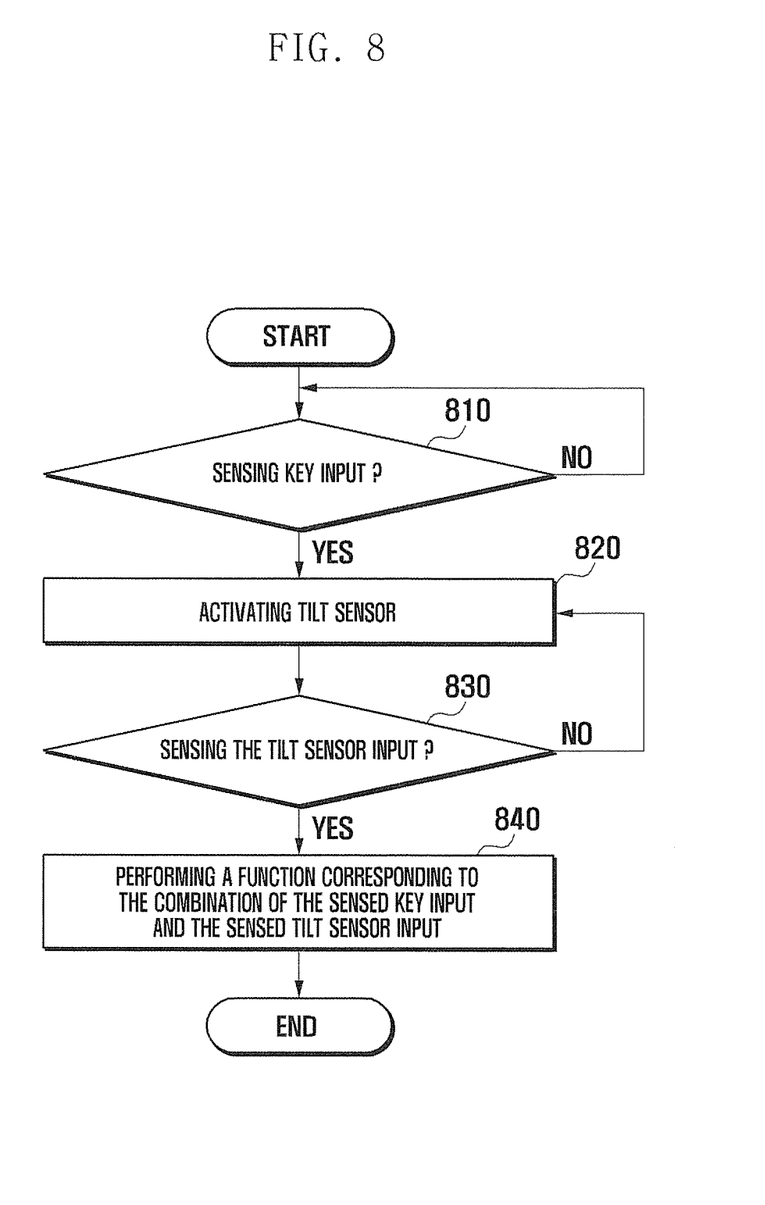
FIG. 8 is a flowchart of a user interface providing process of a terminal according to still another embodiment of the present invention.

FIG. 8 is a flowchart of a user interface providing process of a terminal according to a fourth embodiment of the present invention.

In the above described first embodiment, as illustrated with reference to blocks 530 and 540 of FIG. 5, the function corresponding to the sensed tilt sensor input and the sensed key input is performed only when the same key input is sensed after the tilt sensor input is sensed. However, in the fourth embodiment to be illustrated here, the key input sense block such as block 540 of FIG. 5 is not necessary. Since block 810 of FIG. 8 corresponds to block 510 of FIG. 5, and block 820 of FIG. 8 corresponds to block 520 of FIG. 5, the detailed description is omitted here. The controller 310 determines whether the tilt sensor 400 sensed a tilt input (block 830). When user tilts the terminal after pressing and separating the keys 210, 220, accordingly, the tilt sensor 400 can sense the tilt input. The controller 310 can perform the function corresponding to the combination of the tilt which the tilt sensor 400 sensed for the first time and the key input after the key input is sensed at block 810 (block 840). For example, when the terminal receives a key input in the horizontal state, the function corresponding to the combination of the horizontal tilting and the key input which is inputted at block 810 is performed.

According to another embodiment, when the terminal is maintained in the horizontal state after the key input is sensed at block 810, the controller 310 does not perform the function before a preset time, e.g., 1 second is elapsed, and performs the function mapped to the combination of the sensed key input and the horizontal state after the preset 1 second is elapsed. However, when the tilt sensor 400 senses a tilt direction other than the horizontal state, at block 840, the controller 310 can perform the function corresponding to the combination of the key input which is inputted at block 810 and the tilt which is sensed without waiting for the elapse of 1 second.

According to another embodiment, the controller 310 can perform the function corresponding to the combination of the sensed tilt and the key input only when the tilt sensor 400 senses the same tilt for a preset time. For example, if the terminal tilts to the left and it is not maintained for a preset time, e.g., 1 second, and then, if the terminal tilts to the right and it is maintained for 1 second, the controller can perform, at block 810, the function corresponding to the combination of the right tilting and the key input which is inputted at block 810. When user tilts the terminal while pressing the keys 210, 220, it can be treated identically with a situation where user tilts the terminal after pressing and separating the keys 210, 220.

Variations of the second embodiment of FIG. 6 and the third embodiment of FIG. 7 can be applied to the fourth embodiment. Moreover, the variations mentioned by the description of the first embodiment can be applied to the fourth embodiment. It can be understood that each block of flowchart drawings and the combinations of flowchart drawings can be executed by computer program instructions. These computer program instructions can be installed in a general-purpose computer, a special-purpose computer or in a processor of programmable data processing equipment. Accordingly, the instructions executed through a computer or a processor of programmable data processing equipment creates a means performing functions explained in the flowchart block(s). These computer program instructions are possible to be stored in a computer available or computer readable memory aiming at a computer or a programmable data processing equipment so as to implement functions with a specific method. Accordingly, the instructions stored in the computer available or computer readable memory are possible to create manufactured items including the instruction means performing functions explained in the flowchart block(s). Computer program instructions may be installed in a computer or programmable data processing equipment. Accordingly, the instructions, which create a process which is executed by a computer after a series of motion steps are performed in a computer or programmable data processing equipments to operate a computer or programmable data processing equipments, may provide steps for executing functions explained in flowchart block(s). Moreover, each block can indicate a part of module, segment, or code including one or more executable instructions for executing specified logical function(s).

In addition, it should be noted that, in some execution examples, the functions mentioned in blocks may be executed in another order. For example, two blocks which are consecutively drawn may be substantially simultaneously performed or may be performed in reverse order according to a corresponding function. A term called '~ unit' used in the present embodiment means a software or a hardware element like FPGA or ASIC, and '~ unit' performs some roles. However, the '~ unit' is not limited to the software or the hardware. The '~ unit' can be configured to exist in a storage medium which can be addressed or can be configured to execute one or more processors. Therefore, as an example, the '~ unit' includes elements such as software elements, object-oriented software elements, class elements, and task elements, processes, functions, attributes, procedures, subroutines, segments of program code, drivers, firmware, micro code, circuit, data, database, data structures, tables, arrays, and variables. The elements and the function provided in the unit's can be combined with less elements and '~ unit's or can be separated into additional elements and '~ unit's. Further, elements and the '~ unit's can be implemented to execute one or more CPUs within a device or a security multimedia card.

Although the present disclosure has been described with exemplary embodiments, various changes and modifications may be suggested to one skilled in the art. It is intended that the present disclosure encompass such changes and modifications as fall within the scope of the appended claims.

What is claimed is:

1. A method to provide a user interface in a terminal comprising a tilt sensor, the method comprising:
sensing a first input from a first key of one or more keys,
wherein the first input is associated with a first function;

sensing a tilt input direction by the tilt sensor after sensing the first input from the first key;
sensing a second input;
when sensing the second input, determining whether a key generating the second input is the first key; and
determining whether to perform a second function corresponding to a combination of the first input of the first key and the sensed tilt input direction based on whether the key generating the second input is the first key, wherein the second function is a different function than the first function.

2. The method of claim 1, wherein determining whether to perform the second function further comprises:
performing the second function corresponding to the combination of the first input from the first key and the sensed tilt input direction if the key generating the second input is the first key.

3. The method of claim 1, wherein determining whether to perform the second function comprises:
extracting the second function corresponding to the combination of the first input from the first key and the sensed tilt input direction from a function mapping storage that stores a plurality of functions corresponding to combinations of the first input from the first key of the terminal and sensed tilt input directions.

4. The method of claim 1, wherein sensing the tilt input direction comprises:
activating the tilt sensor after the first input from the first key is sensed; and
sensing the tilt input direction using the activated tilt sensor.

5. The method of claim 1, wherein the first key is one of a first dome key at a position on a front side of the terminal and a second dome key at a position on another side of the terminal.

6. The method of claim 1, further comprising displaying the sensed tilt input direction by the tilt sensor on a display unit of the terminal after the tilt sensor senses the tilt input direction.

7. The method of claim 1, further comprising:
sensing a shake input while sensing the tilt input direction; and
performing the second function corresponding to a combination of the sensed key first input of the first key, the sensed tilt input direction, and the shake input after the tilt sensor senses the tilt input direction and the shake input.

8. The method of claim 1, wherein determining whether to perform the second function further comprises:
if the key sensed by the second input is not the first key, ignoring a function corresponding to the second input, recognizing the second input as the first input from the first key, or recognizing the second input as a termination input to terminate the user interface.

9. A terminal comprising a controller configured to:
receive a signal of a first key input sensed from a first key of one or more keys, wherein the sensed first key input is associated with a first function;
sense a tilt input direction by a tilt sensor after sensing the first key input from the first key;
sense a second input;
when sensing the second input, determine whether a key generating the second input is the first key; and
perform a second function corresponding to a combination of the first key input and the tilt input direction based on whether the key generating the second input is the first key, wherein the second function is a different function than the first function.

10. The terminal of claim 9, wherein the controller is further configured to perform the second function corresponding to the combination of the first key input sensed from the first key and the tilt input direction from a function mapping storage when receiving the second input from the first key while the tilt sensor senses the tilt input direction.

11. The terminal of claim 9, wherein the controller is configured to:
activate the tilt sensor after the controller receives the first input from the first key through a key input sensing circuit, and
sense the tilt input direction using the activated tilt sensor.

12. The terminal of claim 9, wherein the first key comprises one of a first dome key at a position on a front side of the terminal or a second dome key at a position on another side of the terminal.

13. The terminal of claim 9, wherein the controller is configured to control a display of the tilt direction sensed by the tilt sensor after the tilt sensor senses the tilt input direction.

14. The terminal of claim 9, wherein the controller is configured to:
sense a shake input while sensing the tilt input direction; and
perform the second function corresponding to a combination of the sensed key first input of the first key, the sensed tilt input direction, and the shake input after the tilt sensor senses the tilt input direction and the shake input.

15. An apparatus comprising:
a key input sensing circuit configured to sense a first input from a first key of a plurality of keys to a controller, wherein the sensed key first input is associated with a first function;
a tilt sensor configured to sense a tilt input direction of a terminal;
a function mapping storage configured to store a second function corresponding to a combination of the first input from the first key and the tilt input direction, wherein the controller is configured to:
sense a second input,
when sensing the second input, determine whether a key generating the second input is the first key, and
determine whether to perform the second function corresponding to the sensed first input from the first key and the sensed tilt input direction from the function mapping storage based on whether the key generating the second input is the first key, wherein the second function is a different function than the first function.

16. The apparatus of claim 15, wherein the controller is further configured to perform the second function corresponding to the combination of the first input from the first key and the tilt input direction if the key generating the second input is the first key.

17. The apparatus of claim 15, wherein the controller is configured to activate the tilt sensor after the controller receives the first input of the first key from the key input sensing circuit and sense the tilt input direction using the activated tilt sensor.

18. The apparatus of claim 15, wherein the first key comprises one of a first dome key at a position on a front side of the terminal or a second dome key at a position on another side of the terminal.

19. The apparatus of claim 15, wherein the controller is configured to control a display unit of the terminal to display the tilt input direction sensed by the tilt sensor after the tilt sensor senses the tilt input direction.

20. The apparatus of claim 15, wherein the apparatus is configured for use in a wireless terminal.

21. The apparatus of claim 15, wherein the controller is configured to:
   sense a shake input while sensing the tilt input direction; and
   perform the second function corresponding to a combination of the sensed key first input of the first key, the sensed tilt input direction, and the shake input after the tilt sensor senses the tilt input direction and the shake input.

22. The apparatus of claim 15, wherein the controller is further configured to ignore a function corresponding to the second input, recognize the second input as the first input from the first key, or recognize the second input as a termination input to terminate the user interface.

\* \* \* \* \*